(12) United States Patent
Zitting

(10) Patent No.: US 12,313,163 B2
(45) Date of Patent: May 27, 2025

(54) INTERLOCKING ROTARY UNION SEAL

(71) Applicant: Atlas Seals Inc., Salt Lake City, UT (US)

(72) Inventor: Thomas P. Zitting, Salt Lake City, UT (US)

(73) Assignee: Atlas Seals, Inc., Salt Lake City, UT (US)

( * ) Notice: Subject to any disclaimer, the term of this patent is extended or adjusted under 35 U.S.C. 154(b) by 0 days.

(21) Appl. No.: 18/546,062

(22) PCT Filed: Feb. 11, 2022

(86) PCT No.: PCT/US2022/016128
§ 371 (c)(1),
(2) Date: Aug. 10, 2023

(87) PCT Pub. No.: WO2022/174041
PCT Pub. Date: Aug. 18, 2022

(65) Prior Publication Data
US 2024/0318723 A1    Sep. 26, 2024

Related U.S. Application Data

(60) Provisional application No. 63/148,772, filed on Feb. 12, 2021.

(51) Int. Cl.
*F16J 15/3208*    (2016.01)
*F16J 15/3216*    (2016.01)
*F16J 15/3284*    (2016.01)

(52) U.S. Cl.
CPC ....... *F16J 15/3208* (2013.01); *F16J 15/3284* (2013.01); *F16J 15/3216* (2013.01)

(58) Field of Classification Search
CPC .... F16J 15/104; F16J 15/3208; F16J 15/3216; F16J 15/56; F16J 15/3284
See application file for complete search history.

(56) References Cited

U.S. PATENT DOCUMENTS

| | | | | |
|---|---|---|---|---|
| 4,284,280 A | * | 8/1981 | Bertram | F16J 15/006 277/552 |
| 4,681,327 A | * | 7/1987 | d'Agostino | F16J 15/164 277/587 |
| 4,709,932 A | | 12/1987 | Edlund et al. | |
| 4,723,782 A | * | 2/1988 | Muller | F16J 15/164 277/589 |
| 4,953,876 A | * | 9/1990 | Muller | F16J 15/56 277/560 |
| 5,149,107 A | * | 9/1992 | Maringer | F16J 15/3208 277/560 |
| 5,332,236 A | | 7/1994 | Kastuhara et al. | |

(Continued)

FOREIGN PATENT DOCUMENTS

| | | |
|---|---|---|
| DE | 3521525 C1 | 11/1986 |
| WO | 2020120874 A1 | 6/2020 |

*Primary Examiner* — Nicholas L Foster
(74) *Attorney, Agent, or Firm* — Gurr & Brande; Robert A. Gurr

(57) ABSTRACT

An interlocking rotary union seal has pockets at one or more edges of a dynamic seal ring. An elastomer energizer may deform by compression and under pressure into the pockets creating an interlocking geometry which prevents relative rotation between the elastomer energizer and the dynamic seal ring.

8 Claims, 4 Drawing Sheets

(56) References Cited

U.S. PATENT DOCUMENTS

| | | | |
|---|---|---|---|
| 6,290,235 B1 * | 9/2001 | Albertson | F16J 15/3236 |
| | | | 277/552 |
| 8,413,994 B2 * | 4/2013 | Jordan | F16J 15/164 |
| | | | 277/552 |
| 10,052,748 B2 * | 8/2018 | Escolle | F16J 9/20 |
| 11,512,779 B2 * | 11/2022 | Krebs | F16J 15/3284 |
| 2002/0084593 A1 | 7/2002 | Baehl | |
| 2009/0108542 A1 * | 4/2009 | Jordan | F16J 15/164 |
| | | | 277/589 |
| 2012/0091667 A1 * | 4/2012 | Jordan | F16J 15/164 |
| | | | 277/589 |
| 2015/0251304 A1 * | 9/2015 | Escolle | F16J 9/20 |
| | | | 173/206 |
| 2017/0023160 A1 | 1/2017 | Cardi et al. | |
| 2021/0339371 A1 * | 11/2021 | Escolle | F16J 15/3204 |

* cited by examiner

INTERLOCKING ROTARY UNION SEAL

CROSS-REFERENCE TO RELATED APPLICATIONS

This application claims priority to U.S. Provisional Ser. No. 63/148,772 filed on Feb. 12, 2021, which is incorporated herein by reference.

TECHNICAL FIELD

The present disclosure relates to rotary union seals.

BACKGROUND

Seals are used for closing the gap between machine parts in relative motion in a wide variety of applications. Rotary unions are machine parts which allow flow of fluid between relatively rotating machine components. One or more seals prevents loss of fluid external to the rotary union, or ingress of contaminants into the fluid. Typical seals used for rotary unions may comprise a plastic dynamic seal ring (e.g., various compounds of PTFE) and an elastomer energizer (e.g., nitrile rubber O-ring). In a machine assembly, this style of seal can prevent the transfer of fluid or particles at a junction of two machine parts, while allowing reciprocating or rotary motion therebetween.

The seal assembly may be disposed in a groove in a first machine part, and seal against a second machine part in relative reciprocating or rotary motion. The elastomer energizer and dynamic seal ring are intended to remain static with the first machine part and slide against the second machine part at the dynamic interface.

However, when there is relative rotary motion between the first and second machine part, the intended static interface may slip and allow the dynamic seal ring to stick at the intended dynamic interface and remain static with the second machine part. As a result, there is sliding motion between the dynamic seal ring and the elastomer energizer at the intended static interface. This phenomenon is known as "counter-rotation." In liquid sealing applications at elevated pressures, for example 500 to 2000 PSI, this slipping at the intended static interface can cause excess wear of the energizer and lead to leakage.

Accordingly, there is a need for a rotary union seal that prohibits slipping and counter-rotation. The interlocking rotary union seal disclosed herein solves these problems and others.

SUMMARY OF EXAMPLE EMBODIMENTS

In some embodiments, an interlocking rotary union seal comprises a dynamic seal ring comprising one or more pockets. These pockets may be in fluid communication with side channels and are preferably wider than the side channels, but do not extend the full extent through the dynamic seal. The elastomer energizer may deform under pressure into the pockets, creating an interlocking geometry which prevents relative rotation between the elastomer energizer and the dynamic seal ring.

DETAILED DESCRIPTION OF EXAMPLE EMBODIMENTS

Figure 1:
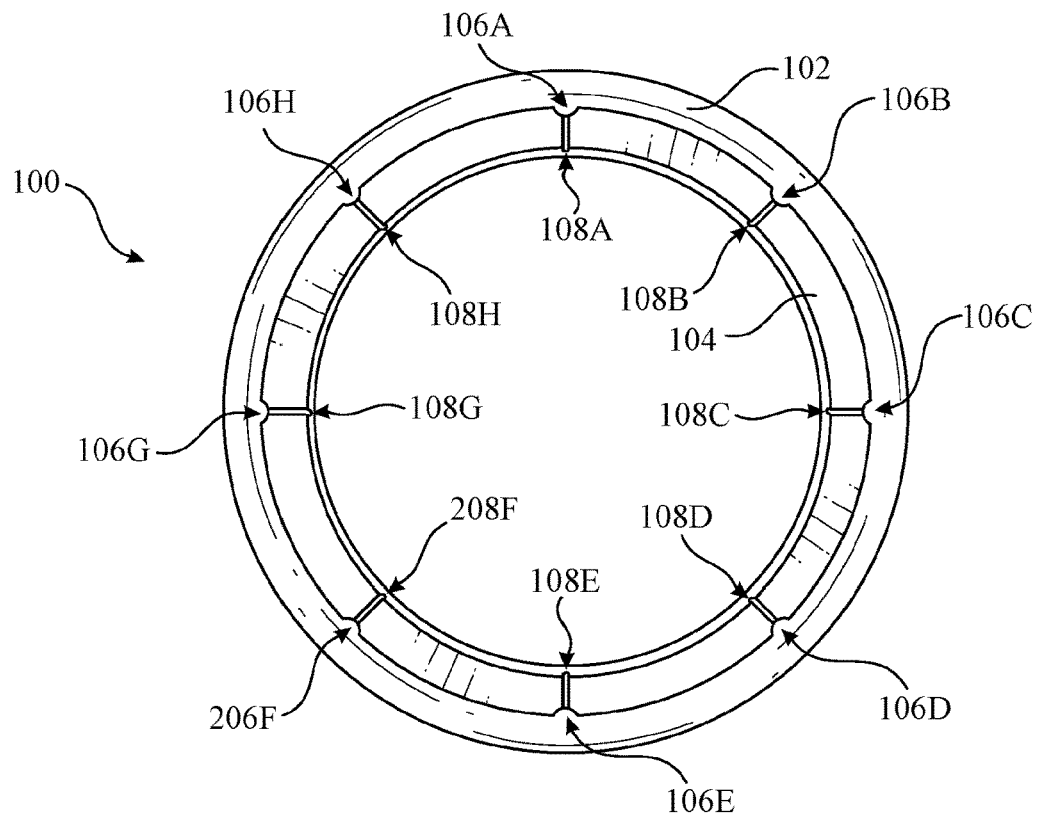
FIG. 1 illustrates a right side elevation view of an interlocking rotary union seal, the left side being a mirror image thereof.
Figure 2:
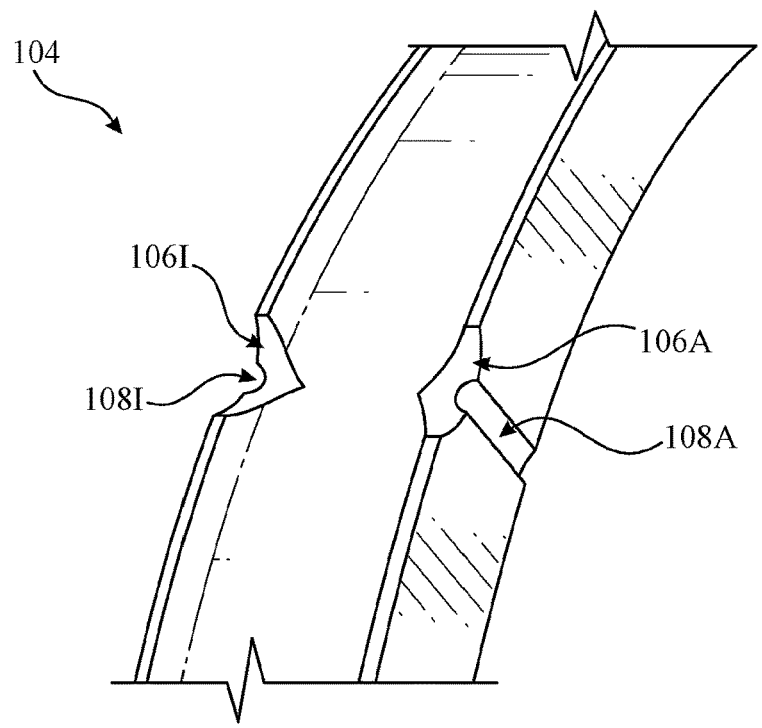
FIG. 2 illustrates a partial, detailed view of a dynamic seal ring of an interlocking rotary union seal.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

Rotary union seals of the prior art have an elastomer energizer and dynamic seal ring. The elastomer energizer and dynamic seal ring are intended to remain static with the first machine part and slide against a second machine part at the dynamic interface. However, due to lack of any interlocking mechanism between the elastomer energizer and the dynamic seal ring, slippage/sliding may occur between the two, leading to excess wear and leakage.

In contrast, the interlocking rotary union seal, as shown in FIGS. 1-7, prevents slippage/sliding between the elastomer energizer and the dynamic seal ring, overcoming problems in the prior art. Specifically, with reference to FIGS. 1-3, an interlocking rotary union seal 100 comprises an elastomer energizer 102 and a dynamic seal ring 104, the dynamic seal ring 104 comprising at least one pocket 106A-I (e.g., cutout or notch). In some embodiments, the one or more pockets 106A-I are in fluid communication with a respective side channel 108A-I. As shown, the pockets 106A-I are generally wider than the side channels 108A-I. While the pockets 106A-I are preferably in direct communication with the side channels 108A-I, such a configuration is not required and it will be appreciated that the one or more pockets 106A-I may be offset in relation to the side channels 108A-I. Additionally, the number of pockets 106A-I need not correlate to the number of side channels 108A-I. Additionally, more or fewer pockets 106A-I and side channels 108A-I may be used without departing herefrom.

Figure 3:
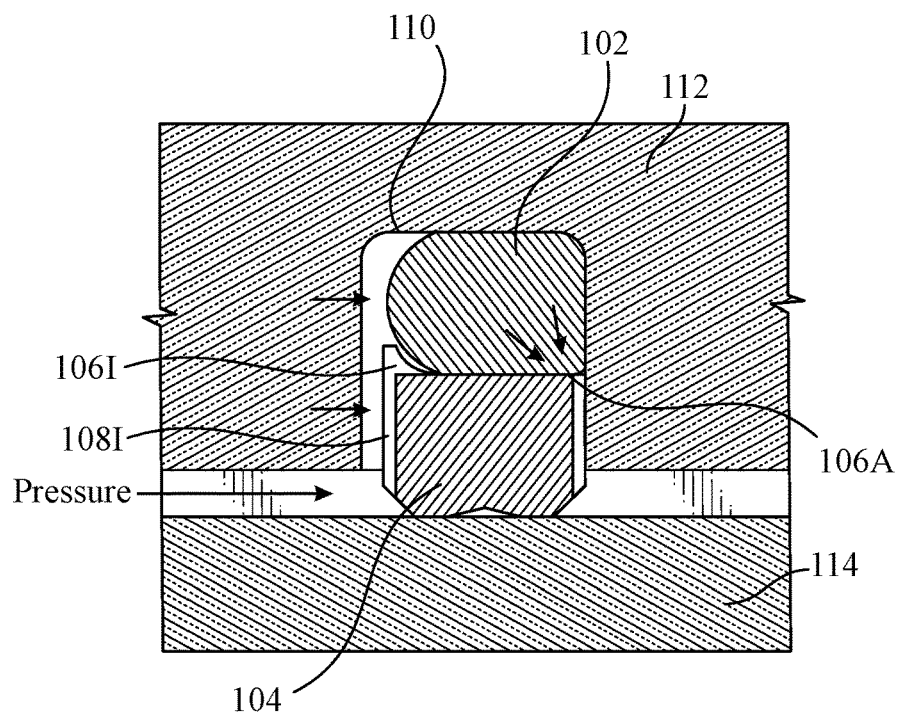
FIG. 3 illustrates a partial cross-section view of an interlocking rotary union seal interposed between a first machine part and a second machine part.
Figure 4:
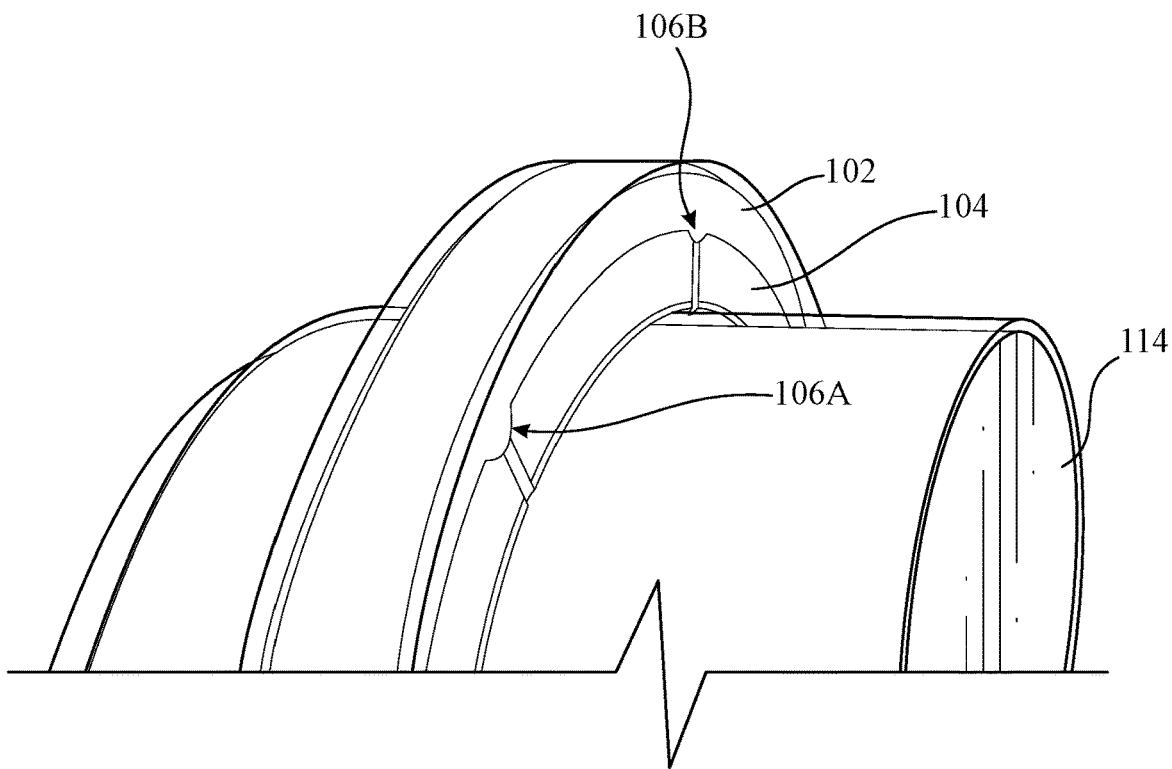
FIG. 4 illustrates an interlocking rotary union seal in use, with the first machine part transparent.
Figure 5:
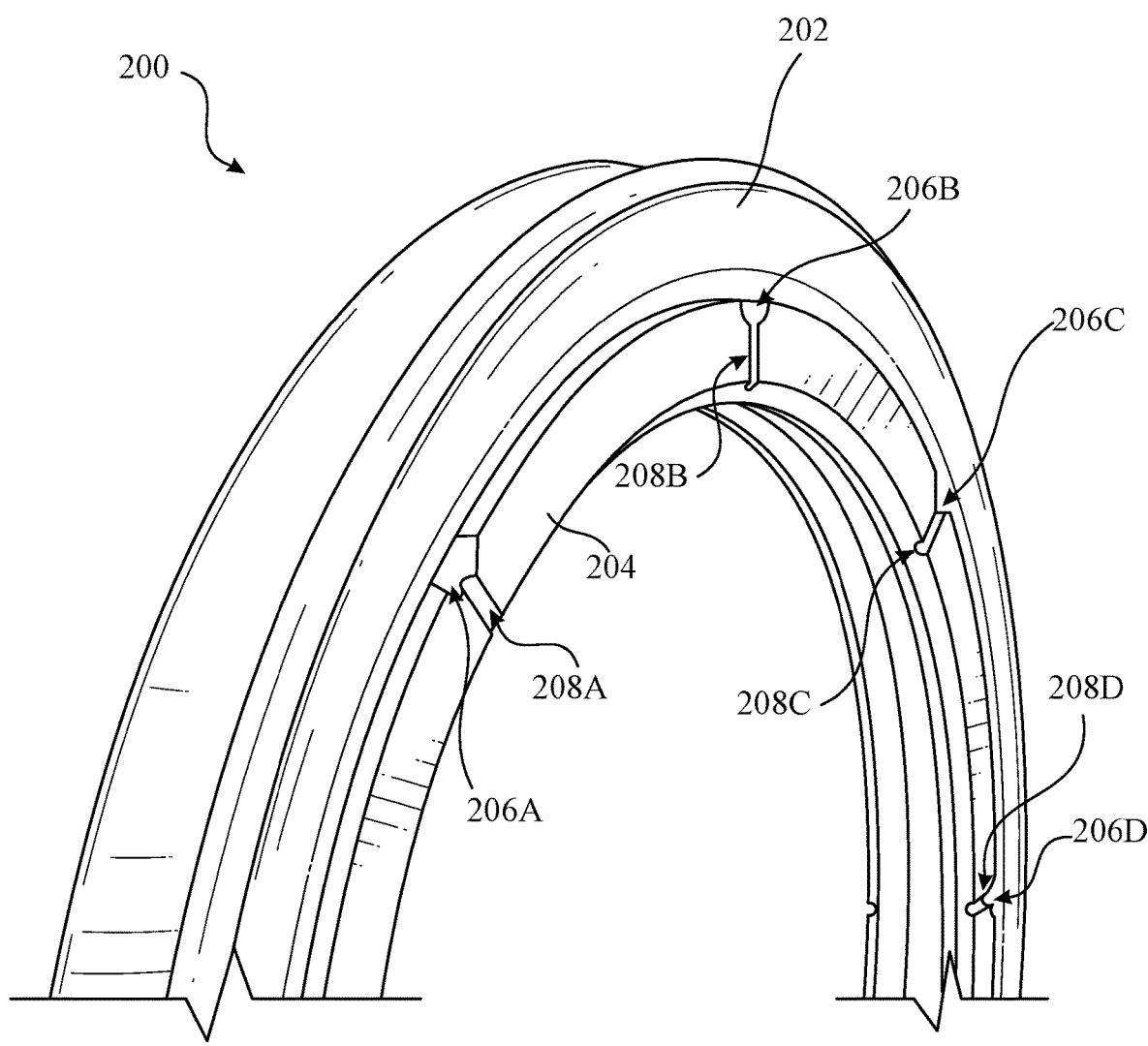
FIG. 5 illustrates a partial, detailed side perspective view of an interlocking rotary union seal.

Referring to FIG. 3, the interlocking rotary union seal 100 is disposed in a groove 110 of a first machine part 112, the elastomer energizer 102 interposed between the first machine part 112 and the dynamic seal ring 104, with the dynamic seal ring 104 in contact with, and sealing, the second machine part 114 with the first machine part 112. As shown, as fluid pressure is applied from left to right (direction of pressure indicated by arrows), the elastomer energizer 102 deforms and fills the pocket 106A on the right. With the elastomer energizer 102 deformed into pocket 106A, the elastomer energizer 102 is interlocked with the dynamic seal ring 104, preventing slippage between the two. As a result, the problems in the prior art are overcome. In some embodiments, the elastomer energizer 102 may be formed with protrusions to each mate with a pocket 106A-I; however, in a preferred embodiment, the elastomer energizer 102 does not have protrusions, which allows for ease of manufacturing (e.g., O-rings) and assembly (no need to align protrusions with pockets), and instead simply deforms into the pockets 106A-I when pressure is applied. FIG. 4 illustrates an interlocking rotary union seal 100 with the first component 112 transparent and showing the elastomer energizer 102 interlocked with dynamic seal ring 104 via the pockets 106A, 106B. In other words, pressure is being applied such that the elastomer energizer is deforming into the pockets 106A, 106B, as shown in FIG. 3.

It will be appreciated that various formfactors of elastomer energizer and dynamic seal ring combinations may be used without departing herefrom. For example, referring to FIGS. 5-7, an interlocking rotary union seal 200 comprises an X-ring (also known as a "quad ring") elastomer energizer 202 and a dynamic seal ring 204. It is important to note that X-ring elastomer energizer and dynamic seal ring combinations in the prior art still experience slippage and counterrotation, leading to excess wear and leakage. In contrast, the dynamic seal ring 204 comprises pockets 206A-D, allowing for the X-ring elastomer energizer 202 to deform therein when pressurized, interlocking the dynamic seal ring 204 and X-ring elastomer energizer 202. In some embodiments, the pockets 206A-D are each positioned at an end of a side channel 208A-D, although this position is not required. Side channels 208A-D allow fluid to evenly propagate to the X-ring elastomer energizer, ensuring equal pressurization around the interlocking rotary union seal 200. As shown, the side channels 208A-D generally extend radially from the inner diameter of the dynamic seal ring 204 to the outer diameter of the dynamic seal ring 204, where it may connect with the pockets 206A-D on an outer edge.

Figure 6:
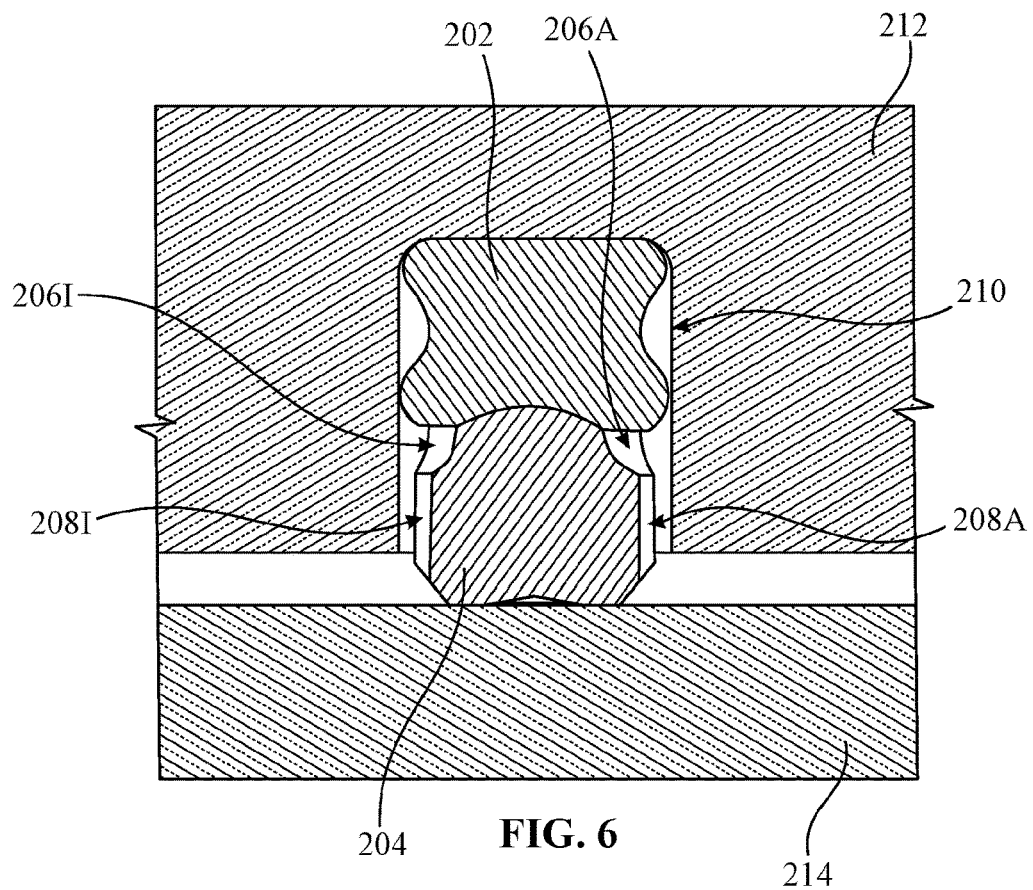
FIG. 6 illustrates a partial cross-section of an interlocking rotary union seal interposed between a first machine part and a second machine part, not under pressure.
Figure 7:
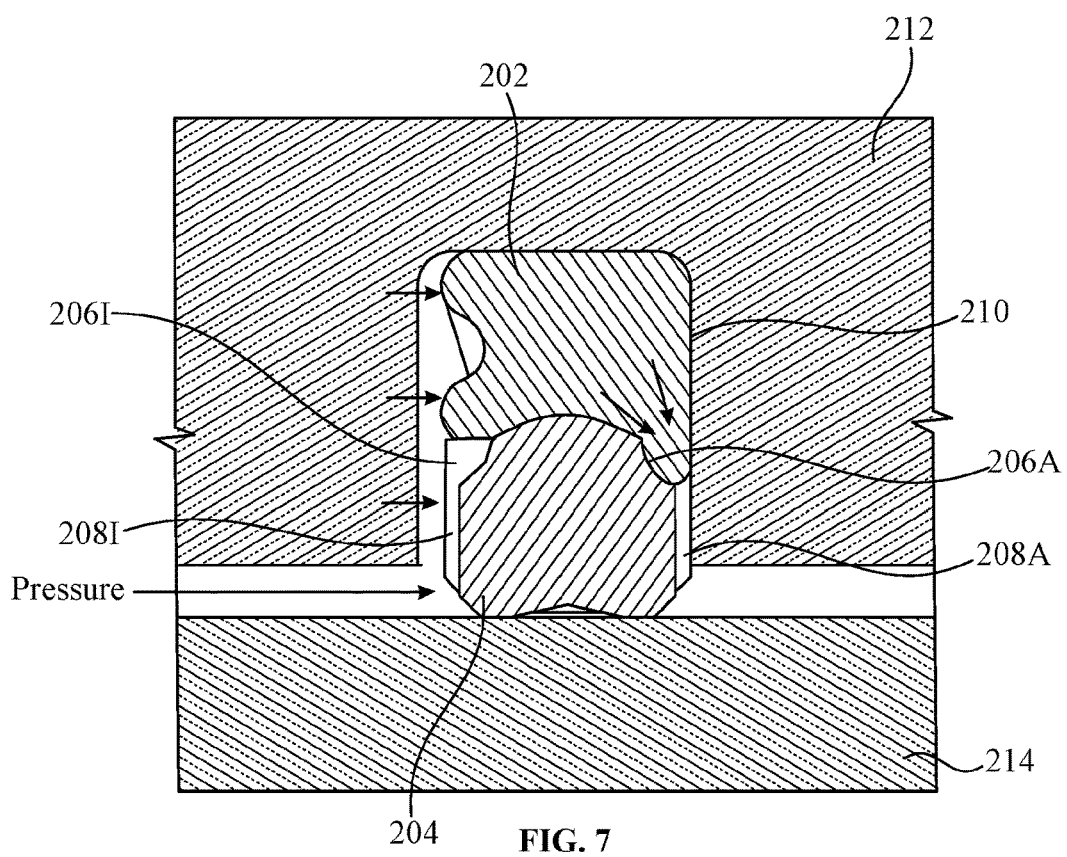
FIG. 7 illustrates a partial cross-section of an interlocking rotary union seal interposed between a first machine part and a second machine part, under pressure.

As shown in FIGS. 6-7, the elastomer energizer 202 and dynamic seal ring 204 are disposed in a groove 210 of a first component 212 to seal the first component 212 to a second component 214. As shown in FIG. 6, the elastomer energizer 202 is in a default, resting position, with no fluid pressure applied. As a result, the elastomer energizer 202 is not deformed into the pockets 206A or 206I. However, once pressure is applied (the direction of the pressure is illustrated with arrows in FIG. 7), the elastomer energizer 202 deforms to fill the pocket 206A. With the elastomer energizer 202 deformed into the pocket 206A, the elastomer energizer 202 is interlocked with the dynamic seal ring 204, thereby preventing relative rotation, wear, and leakage. It will be appreciated that any number of pockets 206A-D may be used and is not limited to the number shown or described herein. Additionally, as noted earlier, while the pockets 106, 206 are shown as aligned with the side channels 108, 208, respectively, such alignment is not required and the pockets 106, 206 may be otherwise located on the dynamic seal ring 104, 204.

Additionally, in some embodiments, the pockets 106, 206 are preferably located on both outer circumferential edges of the dynamic seal ring 104, 204 for use in sealing when pressure is applied in either direction. However, it will be appreciated that pockets 106, 206 need not be located on both sides.

While the interlocking rotary union seal 100, 200 is shown and described as configured to be disposed in an outer housing (first machine part) with a relatively rotatable shaft (second machine part), it should be appreciated that an inverse version is possible. For example, the second machine part may have the groove to receive the interlocking rotary union seal 100, 200 such that the dynamic seal ring 104, 204 is on an outer diameter with the elastomer energizer 102, 202 on an inner diameter, with dynamic relative rotary motion occurring against the inside of a bore of a first machine part.

Therefore, it will be appreciated that the interlocking rotary union seal disclosed herein prevents relative rotation between the elastomer energizer and dynamic rotary seal, thereby reducing wear and preventing leakage, and overcoming problems in the art.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. An interlocking rotary union seal, comprising:
an elastomer energizer; and
a dynamic seal, comprising:
   a plurality of side channels, each side channel extending from proximate an inner diameter of the dynamic seal to proximate an outer diameter of the dynamic seal,
   a plurality of pockets, each pocket at an edge of the dynamic seal and at an end of, and directly connected to, a respective one of the side channels of the plurality of side channels, and wherein each pocket is circumferentially wider than each side channel;
wherein the elastomer energizer is deformable, under pressure, to fill one or more of the plurality of pockets of the dynamic seal ring.

2. The interlocking rotary union seal of claim 1, wherein the elastomer energizer is an X-ring elastomer energizer.

3. The interlocking rotary union seal of claim 1, wherein the plurality of side channels are each located on a first axial face of the dynamic seal, and wherein a second axial face comprises a second plurality of side channels and a second plurality of pockets, each pocket of the second plurality of pockets at a second edge of the dynamic seal and at an end of, and directly connected to, a respective one of the side channels of the second plurality of side channels, and wherein each pocket of the second plurality of pockets is circumferentially wider than each side channel of the second plurality of side channels.

4. An interlocking rotary union seal, comprising:
an elastomer energizer; and
a dynamic seal, comprising:
   a plurality of side channels, each side channel extending radially on a first axial face of the dynamic seal, and
   a plurality of pockets, each pocket at a circumferential edge of the dynamic seal nearest the elastomer energizer, and each respective pocket of the plurality of pockets connected to a respective one of the side channels of the plurality of side channels, wherein each pocket is circumferentially wider than each side channel, and wherein each pocket does not extend completely around an outer circumference of the dynamic seal;
wherein the elastomer energizer is deformable, under pressure, to fill one or more of the plurality of pockets of the dynamic seal ring.

5. The interlocking rotary union seal of claim 4, wherein the elastomer energizer is an X-ring elastomer energizer.

6. The interlocking rotary union seal of claim 4, wherein the dynamic seal further comprises:
a second plurality of side channels, each side channel of the second plurality of side channels extending radially on a second axial face of the dynamic seal, and a second plurality of pockets, each pocket of the second plurality of pockets at a second edge of the dynamic seal and at an end of, and directly connected to, a respective one of the side channels of the second plurality of side channels, and wherein each pocket of the second plurality of pockets is circumferentially wider than each side channel of the second plurality of side channels.

7. An interlocking rotary union seal, comprising:
an elastomer energizer; and
a dynamic seal, comprising:
   a first axial face, comprising:
      a first plurality of side channels, each side channel extending radially on the first axial face of the dynamic seal,
      a first plurality of pockets, each pocket at a circumferential edge of the dynamic seal nearest the elastomer energizer, and each respective pocket of the first plurality of pockets connected to a respective one of the side channels of the first plurality of side channels, and wherein each pocket of the first plurality of pockets is circumferentially wider than each side channel of the first plurality of side channels; and
   a second axial face, comprising:
      a second plurality of side channels, each side channel extending radially on the second axial face of the dynamic seal,
      a second plurality of pockets, each pocket at a circumferential edge of the dynamic seal nearest the elastomer energizer, and each respective pocket of the second plurality of pockets connected to a respective one of the side channels of the second plurality of side channels, and wherein each pocket of the second plurality of pockets is circumferentially wider than each side channel of the second plurality of side channels;
wherein the elastomer energizer is deformable, under pressure, to fill one or more of the first or second plurality of pockets of the dynamic seal ring.

8. The interlocking rotary union seal of claim 7, wherein the elastomer energizer is an X-ring elastomer energizer.

* * * * *